United States Patent
Mao et al.

(10) Patent No.: US 8,602,893 B2
(45) Date of Patent: Dec. 10, 2013

(54) INPUT FOR COMPUTER DEVICE USING PATTERN-BASED COMPUTER VISION

(75) Inventors: Xiaodong Mao, Foster City, CA (US); Noam Rimon, Redwood City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 697 days.

(21) Appl. No.: 12/792,628

(22) Filed: Jun. 2, 2010

(65) Prior Publication Data

US 2011/0300939 A1   Dec. 8, 2011

(51) Int. Cl.
*G06F 17/00* (2006.01)

(52) U.S. Cl.
USPC ............................................. 463/36; 382/103

(58) Field of Classification Search
USPC ............................................. 463/36; 382/103
See application file for complete search history.

(56) References Cited

U.S. PATENT DOCUMENTS

| | | | | |
|---|---|---|---|---|
| 6,007,426 A * | 12/1999 | Kelly et al. | ...................... | 463/16 |
| 6,028,955 A * | 2/2000 | Cohen et al. | .................. | 382/154 |
| 6,556,722 B1 * | 4/2003 | Russell et al. | ................ | 382/291 |
| 6,728,582 B1 * | 4/2004 | Wallack | .......................... | 700/64 |
| 7,397,464 B1 * | 7/2008 | Robbins et al. | ............... | 345/173 |
| 7,845,560 B2 * | 12/2010 | Emanuel et al. | ......... | 235/462.08 |
| 8,210,435 B2 * | 7/2012 | Mahan et al. | ............. | 235/462.01 |
| 8,224,024 B2 * | 7/2012 | Foxlin et al. | ................... | 382/103 |
| 2004/0016077 A1 * | 1/2004 | Song et al. | ....................... | 15/319 |
| 2010/0018103 A1 * | 1/2010 | Holmberg | ........................ | 42/124 |
| 2010/0091112 A1 * | 4/2010 | Veeser et al. | ................ | 348/207.1 |
| 2010/0315524 A1 * | 12/2010 | Gordon et al. | ............. | 348/222.1 |
| 2011/0168774 A1 * | 7/2011 | Magal | ............................ | 235/375 |

FOREIGN PATENT DOCUMENTS

JP    2002215319    8/2002

OTHER PUBLICATIONS

Japanese Notification of Reason(s) for Refusal mailed date Apr. 24, 2012 issued for Japanese Application No. 2011-121661.

\* cited by examiner

*Primary Examiner* — Michael Cuff
(74) *Attorney, Agent, or Firm* — Joshua D. Isenberg; JDI Patent

(57) ABSTRACT

Images of a least a portion of a structurally encoded pattern formed on a surface from a camera can be analyzed to determine a position of a camera. The structurally encoded pattern can include a plurality of elements. Each element can be encoded with information identifying a location and orientation of the element with respect to the surface. A computer program can identify at least a portion of one or more pattern elements in the image and determine the position of the camera relative to the surface from the information encoded in the one or more pattern elements in the image.

21 Claims, 3 Drawing Sheets

INPUT FOR COMPUTER DEVICE USING PATTERN-BASED COMPUTER VISION

CROSS-REFERENCE TO RELATED APPLICATION

This application is related to commonly-assigned, co-pending application Ser. No. 12/792,567, entitled "CAPACITIVE INPUT FOR COMPUTER PROGRAM" filed the same day as the present application, the entire disclosures of which are incorporated herein by reference.

This application is related to commonly-assigned, co-pending application Ser. No. 12/792,586, entitled "MAGNETIC INPUT FOR COMPUTER DEVICE" filed the same day as the present application, the entire disclosures of which are incorporated herein by reference.

FIELD OF THE INVENTION

Embodiments of the present invention relate generally to computer entertainment devices and more particularly to an interface for a computer entertainment device using pattern-based computer vision.

BACKGROUND OF THE INVENTION

Video games have become a very popular form of entertainment. A typical video game utilizes an interface or controller to receive inputs from a user. A common type of controller is a hand-held controller that uses pushbuttons or joysticks to provide inputs. Another type of controller, commonly referred to as a "dance pad" is used with games based on dance. In a typical dance-based game a user is prompted to press selected buttons on the dance pad at specific times in response to some sort of visual indicator displayed on a video screen. In the dance pad, the control buttons are typically integrated into a plastic mat. The user can press different control buttons by stepping or dancing on corresponding areas of the mat.

A dance pad basically acts as a pushbutton controller that is operated with the feet as opposed to the hands. However, the dance pad does not track the proximity a user's feet.

It is within this context that embodiments of the invention arise.

It is within this context that embodiments of the invention arise.

BRIEF DESCRIPTION OF THE DRAWINGS

Examples of embodiments of the present invention can be readily understood by considering the following detailed description in conjunction with the accompanying drawings, in which.

DESCRIPTION OF THE SPECIFIC EMBODIMENTS

Figure 1:
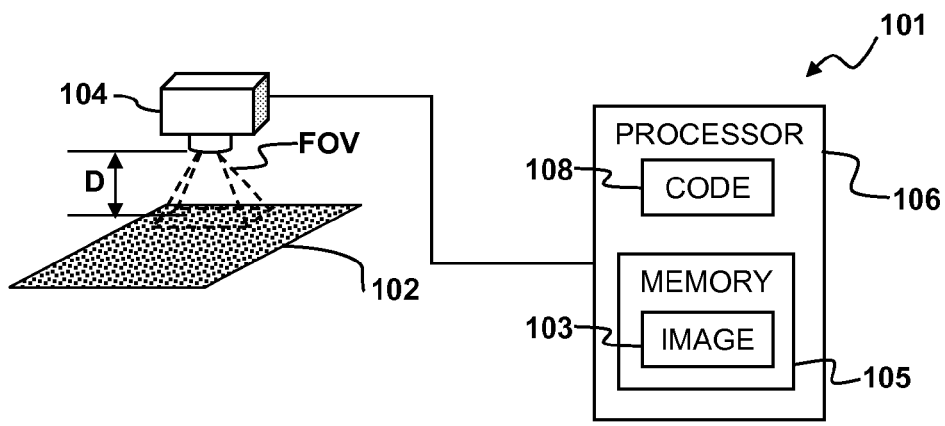
FIG. 1 is a schematic diagram illustrating an input apparatus for a computer system according to an embodiment of the present invention.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Embodiments of the present invention utilize a concept referred to herein as pattern-based computer vision.

According to an embodiment of the present invention, an input apparatus can track the position and/or motion of a camera relative to the surface using pattern-based computer vision. A structurally encoded pattern is printed on a surface. The camera analyzes an image of the surface including portions of the pattern to determine the relative position (x,y,z) and orientation (pitch, roll, and yaw) of the camera relative to the surface. A computer vision system can track the positions and orientations of the camera by analyzing portions of the pattern in captured real-time images to reference pattern elements in the images to coordinate locations of pattern elements with respect to the surface.

According to embodiments of the invention, a structurally encoded pattern (sometimes referred to as cyber-code) can be printed on a mat or other surface. Cameras can be mounted on the back of each of the user's feet or on the palms of the user's hands.

Embodiments

According to a first embodiment, an input apparatus 101 for a computer device may include a computer processor 106 can be configured to execute computer executable instructions 108. The instructions 108 are configured to cause the computer device to obtain an image 103 of a least a portion of a structurally encoded pattern 102 formed on a surface. The image 103 can be obtained with a camera 104 coupled to the processor 106. The camera 104 can capture an image of a portion of the pattern 102 that lies within a field of view FOV of the camera 104. The image 103 can be stored in the form of analog or digital data in a memory 105 that is coupled to the processor 106. The camera 104 may be coupled to the processor 106 and/or memory 105 by a suitable data link, which may be implemented by an electrical or fiber optic cable or wireless means, such as radiofrequency (RF), infrared or free space optical link. Alternatively, the memory 105 processor 106 may be implemented by integrated circuits that are components of the camera 104.

The structurally encoded pattern 102 includes a plurality of elements. Each element is encoded with information identifying a location and orientation of the element with respect to the surface. The instructions 108 are configured to cause the processor 106 to identify at least a portion of one or more elements in the image 103. The instructions can be further configured to determine a position of the camera relative to the surface from the information encoded in the one or more pattern elements in the image 103.

The processor 106 can use the position of the camera as an input to a computer program 110. By way of example, and not by way of limitation, the program 110 can be a game program such as a video game program.

Figure 2A:
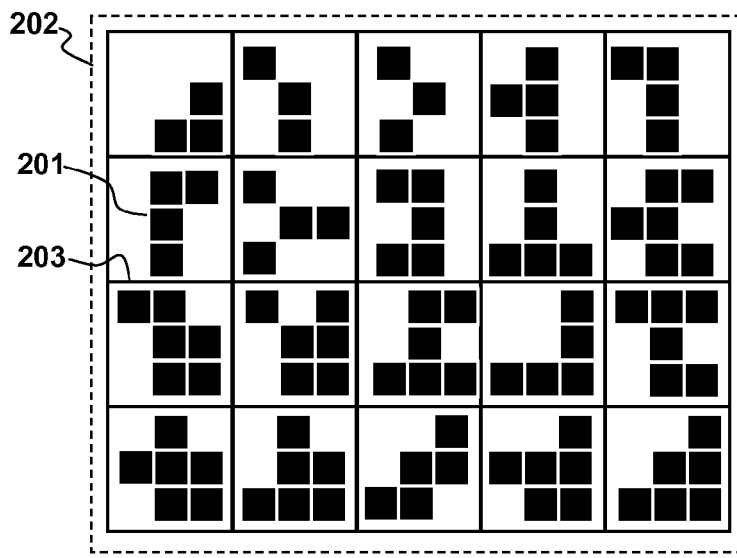
FIG. 2A is a schematic diagram of an example of a structurally encoded pattern that can be used with the interface of FIG. 1.

By way of example, and not by way of limitation, FIG. 2A illustrates an example of a possible structurally encoded pattern 202. The structurally encoded pattern 202 can be formed, e.g., by printing, on a mat. Alternatively, the pattern 202 may be printed or otherwise formed directly on a floor, wall, or other suitable surface. The structurally encoded pattern can include a plurality of cells 201. Each cell contains a unique element that is different from every other element in every other cell in the pattern. Grid lines 203 may facilitate in distinguishing one cell from another. In the example shown in FIG. 2A, the patterns in each cell 201 are based on a 3×3 grid of squares. Squares within the grid are either black or white. The pattern of black and white squares within each element is chosen so that no two elements are alike. In this way, the processor 106 can identify a given cell in an image by the pattern of black and white squares in the cell.

Figures 2B, 2C, 2D, 2E:
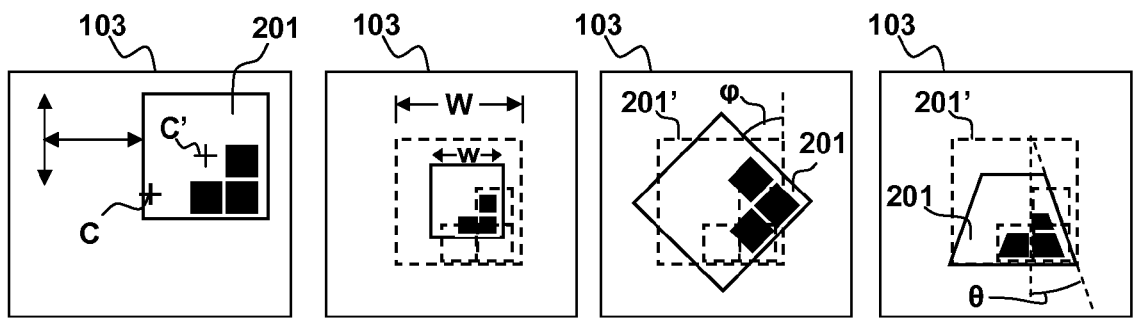
FIGS. 2B-2E are schematic diagrams illustrating examples of determining a position and orientation of a camera from an image of an element in a structurally encoded pattern.

In some versions of this embodiment, the processor 106 can be configured to determine the position of the camera by comparing the image 103 to reference data representing the pattern 202. There are a number of ways of determining the position of the camera from the image from reference data. For example, a center C of the image can be associated with a projection of the position of the camera in three dimensions onto the plane of the pattern 202. Each cell can be associated with a known position within the pattern 202. The instructions 108 can identify a cell 201 closest to the center C of the image 103 as shown in FIG. 2B. The position of the cell closest to the image center C can provide a coarse position. The coarse position can be refined by determining the location of the image center C with respect to a center C' of the cell 201.

The processor 106 can also analyze the image 103 to determine a perpendicular distance D of the camera 104 relative to the plane of the pattern 202. As used herein, the term "perpendicular distance" refers to a distance along an axis perpendicular to the plane of the pattern. By way of example, as shown in FIG. 2C, a characteristic size w of the cell 202 within the image 103 can be compared to a reference size W of the cell 202. The reference size W can be determined when the camera 104 is at a known perpendicular distance $D_{ref}$ from the pattern 202. The perpendicular distance D can be determined from the known perpendicular distance $D_{ref}$ and the ratio W/w.

$$D = D_{ref}(W/w).$$

The instructions 108 can also be configured to determine an angular orientation of the camera 104 with respect to the pattern 202 as illustrated in FIG. 2D and FIG. 2E. For example, the pattern of black and white squares in each element 201 can be chosen so that each element is not rotationally symmetric with respect to an axis normal to the plane of the surface. If the pattern is not rotationally symmetric, the processor 106 can determine a rotational orientation angle • of the camera with respect to the axis normal to the plane of the surface by comparing the orientation of a cell 201 in the image 103 to the orientation of a reference cell 201' as shown in FIG. 2D.

Alternatively, the instructions 108 can cause the processor 106 to analyze a distortion of a cell 201 in the image 103 to determine a pitch or roll of the camera relative to the pattern 202. For example, as shown in FIG. 2E, the instructions can analyze an angle of convergence • for grid lines within the cell or gridlines between cells in the image 103. The angle of convergence • can be related to an angle of pitch of the camera relative to the pattern 202.

Figure 3:
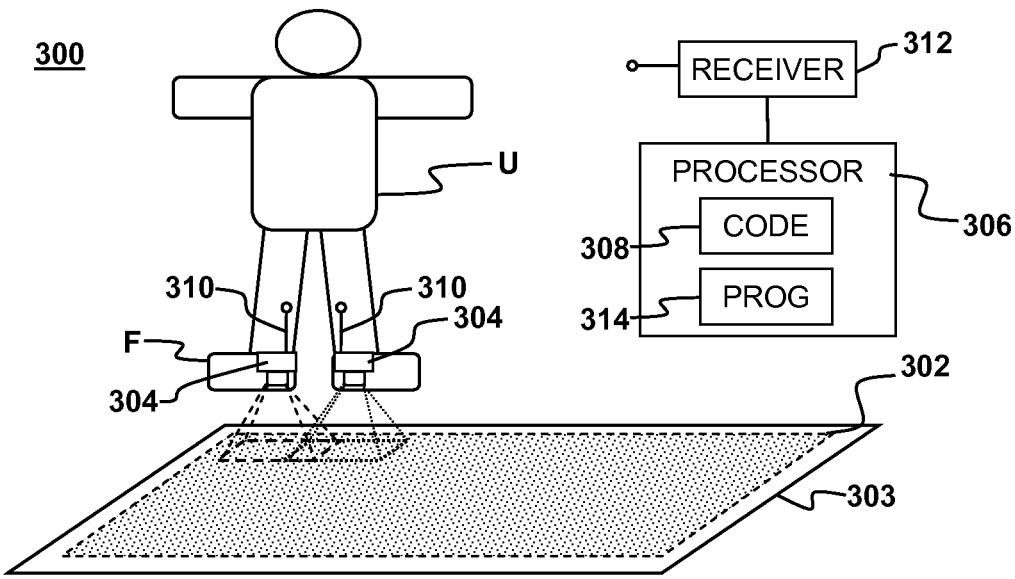
FIG. 3 is a schematic diagram of an example of a system using an input apparatus for a computer system according to an alternative embodiment of the present invention.

A number of variations on the apparatus depicted in FIG. 3 are within the scope of embodiments of the present invention. For example, as noted above, the structurally encoded pattern may be formed a mat. The mat can be made of a flexible material that permits the mat to be rolled up or folded for storage. By way of example, and not by way of limitation, the mat may be made of a polymer, rubber, cloth, mesh, or a composite material having layers of polymer, rubber, cloth or mesh According to embodiments of the present invention, an apparatus of the type described above with respect to FIG. 1 and FIGS. 2A-2E may be configured to sense motion of a user's feet. A structurally encoded pattern can be placed on a floor, e.g., by printing the pattern onto a mat and placing the mat on the floor. To sense motion of the user's feet, the user may wear cameras on each foot.

Figure 4:
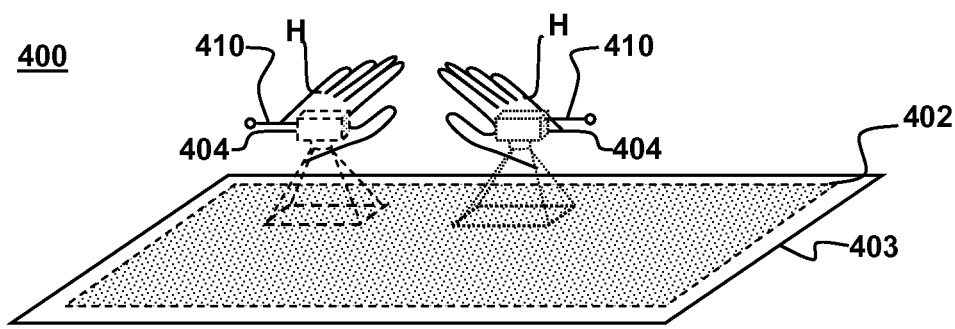
FIG. 4 is a schematic diagram of an example of a system using an input apparatus for a computer system according to another alternative embodiment of the present invention.
Figure 4:
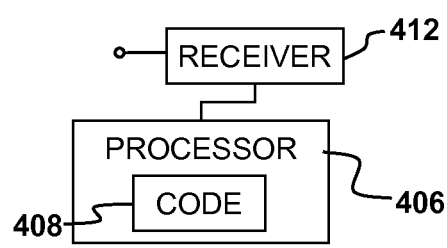

By way of example, and not by way of limitation, according to an alternative embodiment of the present invention depicted in FIG. 4 an input apparatus 300 for a computer device (e.g., a computer entertainment device) may include one or more cameras 304 configured to be worn on the feet F of a user U and a mat 303 having a structurally encoded pattern 302 that includes a plurality of elements, each of which is encoded with information identifying a location and orientation of the element. The pattern 302 which may be configured as described above with respect to FIGS. 2A-2E.

The cameras 304 can be coupled to a processor 306, the processor can execute coded instructions 308 to determine the position of each camera from analysis of images of portions of the pattern 302 that lie within the respective fields of view of the cameras 304. By way of example, the cameras 304 can be coupled wirelessly to the processor 306 via transmitters 310 and a receiver 312. By way of example, and not by way of limitation, the transmitter 310 and receiver 312 can implement a personal area wireless network connection, through a radiofrequency link, such as Bluetooth connection.

By way of example and not by way of limitation, the processor 306 can be configured to determine the position of each camera 304 by obtaining images of a least a portion of the pattern 302 from the cameras 304, identifying at least a portion of one or more pattern elements in the image, and determining the camera positions from the information encoded in the pattern element(s) in the image.

In some versions of this embodiment, the processor 306 can be configured to provide the locations of the cameras 304 as inputs to a computer program 314. In such embodiments, the program 314 can be a game program or part of a game program.

In another alternative embodiment of the invention shown in FIG. 4, an input apparatus 400 for a computer device (e.g., a computer entertainment device) may include one or more cameras 404 configured to be worn on the hands H of a user and a mat 403 having a structurally encoded pattern 402 that includes a plurality of elements, each of which is encoded with information identifying a location and orientation of the element. The pattern 402 which may be configured as described above with respect to FIGS. 2A-2E.

The cameras 404 can be coupled to a processor 406, e.g., through wireless transmitters 410 and a receiver 412. The processor 406 can execute coded instructions 408 to determine the position of each camera from analysis of images of portions of the pattern 402. The processor 406 can be configured to determine the position of each camera 404 from images of a least a portion of the pattern 402 from the cameras

404, e.g., as described above. The locations of the cameras 404 can serve as inputs to a computer program 414, e.g., a game program.

Figure 5:
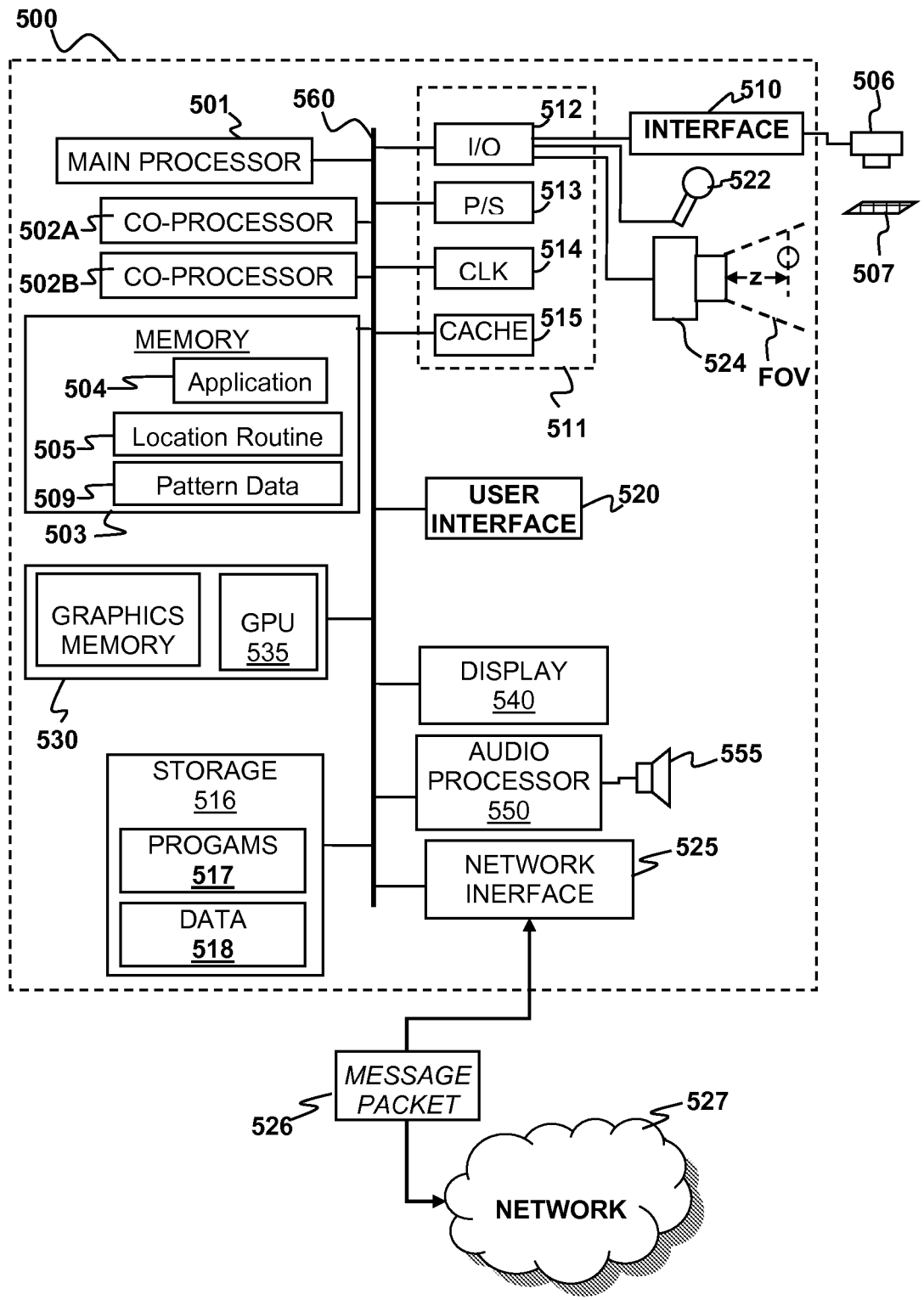
FIG. 5 is a block diagram of a computer system according to an embodiment of the present invention.

A pattern-based computer vision apparatus configured in accordance with embodiments of the present invention may be combined with a computer entertainment device in any of a number of ways. By way of example, FIG. 5 is a block diagram illustrating a computer entertainment apparatus 500 utilizing a pattern-based computer vision input according to an embodiment of the present invention. By way of example, and without loss of generality, the apparatus 500 may be implemented as part of a computer system, such as a personal computer, video game console, personal digital assistant, cellular telephone, hand-held gaming device, portable internet device or other digital device. In a preferred embodiment, the apparatus is implemented as part of a video game console.

The apparatus 500 generally includes one or more processing units. By way of example, and not by way of limitation, the one or more processing units may include at least one main processing unit 501 and one or more co-processor elements 502A, 502B. Each co-processor element may have a processor unit and an associated local memory. The apparatus can include a memory unit 503 that is separate from the processing unit 501 or co-processor elements 502A, 502B.

The processing unit 501 may include one or more processing cores. By way of example and without limitation, the main processing unit 501 and co-processor elements 502A, 502B may be part of a parallel processor module, such as a Cell Processor. An example of a Cell Processor architecture is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

In a Cell Processor architecture, the computational unit corresponding to the processing unit 501 is referred to as a "Power Processing Element" (PPE) and the computational units corresponding to the co-processor elements 502A, 502B are referred to as "Synergistic Processing Elements" (SPE). It is noted that a Cell Processor architecture is but one example, among others, of a suitable processor architecture that may be used with embodiments of the invention. However, embodiments of the present invention may be implemented using other multi-processor architectures.

The memory unit 503 may be any suitable medium for storing information in computer readable form. By way of example, and not by way of limitation, the memory unit 503 may include random access memory (RAM) or read only memory (ROM), a computer readable storage disk for a fixed disk drive (e.g., a hard disk drive), or a removable disk drive.

The apparatus 500 may also include well-known support functions 511, such as input/output (I/O) elements 512, power supplies (P/S) 513, a clock (CLK) 514 and cache 515. The apparatus 500 may further include a storage device 516 that provides non-volatile storage for software program instructions 517 and data 518. By way of example, the storage device 516 may be a fixed disk drive, removable disk drive, flash memory device, tape drive, CD-ROM, DVD-ROM, Blu-ray, HD-DVD, UMD, or other optical storage devices.

A pattern-based computer vision interface 510 can be coupled to the processing unit 501, e.g., via the I/O elements 512. In general, the interface 510 may include one or more cameras. The cameras may be configured to be worn on a user's feet or hands. The cameras can obtain images from a structurally encoded pattern that can be placed on a suitable surface. The structurally encoded pattern can include a plurality of elements, each of which is encoded with information identifying a location and orientation of the element. The pattern which may be configured as described above with respect to FIGS. 2A-2E, 3, and 4.

The main processing unit 501 and co-processors 502A, 502B may be configured to run software applications and optionally an operating system. Portions of such software applications may be stored in the memory unit 503. Instructions and data may be loaded into registers of the main processing unit 501 or local stores of the co-processor elements 502A, 502B for execution. The software applications may include a main application 504, such as a video game application. The main application 504 may operate in conjunction with a pattern-based camera location routine 505 that obtains an image of a least a part of a structurally encoded pattern 507, identifies at least a portion of one or more pattern elements in the image, and determines a position of the camera 506 relative to the pattern 507 from information encoded in one or more pattern elements in the image. The location routine 505 may utilize pattern data 509 stored in the memory 503. The pattern data 509 can relate the structurally encoded data in each pattern element to a location within the pattern. The location routine 505 can compare data derived from images of the pattern 507 obtained with the camera 506 to the pattern data to determine the location and/or orientation of the camera 506 relative to the pattern.

It is noted that the location routine 505 may be implemented on a processor that is part of the interface 510 and separate from the main processor 501 or co-processors 502A, 502B, furthermore, at least part of the location routine may be implemented by a processor that is part of the camera 506.

The camera location routine 505 may trigger the application 504 to change a state of the apparatus 500 when one or more magnets are determined to be in a particular location. As used herein, a "change of state" refers to a change in the operation of the apparatus. By way of example, a change of state may include execution of a command or selection of particular data for use by another process handled by the application 504. A non-limiting example of execution of a command would be for the apparatus to begin the process of comparing a calculated position of a magnet to a predetermined position for the magnet at a particular time. A score may be determined based on the proximity of the calculated position to the predetermined position. A sequence of predetermined positions may be established with respect to a particular time reference, such as a time reference within a piece of music that is playing in conjunction with the program 504. Magnets may be placed on the user's feet and/or hands. By sequentially comparing the calculated position the predetermined positions at the relevant times, the apparatus 500 may continuously track the position of the user's feet and/or hands as the user dances on the mat. The program can score the user based on how closely the user follows a predetermined sequence of dance steps selected for a given piece of music.

The apparatus 500 may include a network interface 525 to facilitate communication via an electronic communications network 527. The network interface 525 may be configured to implement wired or wireless communication over local area networks and wide area networks such as the Internet. The system 500 may send and receive data and/or requests for files via one or more message packets 526 over the network 527.

The apparatus 500 may further comprise a graphics subsystem 530, which may include a graphics processing unit (GPU) 535 and graphics memory 537. The graphics memory 537 may include a display memory (e.g., a frame buffer) used for storing pixel data for each pixel of an output image. The graphics memory 537 may be integrated in the same device as the GPU 535, connected as a separate device with GPU 535, and/or implemented within the memory unit 503. Pixel data may be provided to the graphics memory 537 directly from the processing unit 501 and/or or co-processors 502A, 502B. In some embodiments, the graphics unit may receive a video signal data extracted from a digital broadcast signal decoded by a decoder (not shown). Alternatively, the processing unit 501 may provide the GPU 535 with data and/or instructions defining the desired output images, from which the GPU 535 may generate the pixel data of one or more output images. The data and/or instructions defining the desired output images may be stored in memory 502 and/or graphics memory 537. In an embodiment, the GPU 535 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 535 may further include one or more programmable execution units capable of executing shader programs.

The graphics subsystem 530 may periodically output pixel data for an image from the graphics memory 537 to be displayed on a video display device 540. The video display device 550 may be any device capable of displaying visual information in response to a signal from the apparatus 500, including CRT, LCD, plasma, and OLED displays that can display text, numerals, graphical symbols, or images. The digital broadcast receiving device 500 may provide the display device 540 with a display-driving signal in analog or digital form, depending on the type of display device. In addition, the display 540 may be complemented by one or more audio speakers that produce audible or otherwise detectable sounds.

To facilitate generation of such sounds, the apparatus 500 may further include an audio processor 550 adapted to generate analog or digital audio output from instructions and/or data provided by the processing unit 501, memory unit 502, and/or storage 516. The audio output may be converted to audible sounds, e.g., by a speaker 555.

The components of the apparatus 500, including the main processing unit 501, co-processor elements 502A, 502B, interface 510, support functions 511, data storage 516, conventional user input devices 520 such as a game controller, keyboard, or mouse, network interface 525, graphics subsystem 530 and audio processor 550 may be operably connected to each other via one or more data buses 560. These components may be implemented in hardware, software, firmware, or some combination of two or more of these.

Embodiments of the present invention are usable with applications or systems that utilize a microphone 522 and a camera 524 in addition to the camera 506 used with the interface 510. The camera 524 may be a depth camera, sometimes also known as a 3D camera or zed camera. The microphone 522 and camera 524 may be coupled to the data bus via the I/O functions. The main application 504 may analyze images obtained with the camera to determine information relating to the location of persons or objects within a field of view FOV of the camera 524. The location information can include a depth z of such persons or objects. The main application 504 may use the location information in conjunction with information from the capacitive interface as described above to obtain information regarding the location of the user and information regarding the orientation of the user's body. This information may be used to provide additional inputs to the application 504.

Embodiments of the invention allow for a greater degree of resolution in tracking the position of the user's feet and/or hands than is possible with a conventional prior art dance mat. In addition, embodiments of the present invention allow for tracking of the user's hands and/or other parts of the user's body on which cameras are placed.

In addition, embodiments of the invention also allow first and second order differentiation with respect to time of the relative position of the feet and/or hands. Such differentiation can be used to determine the velocity and acceleration of the feet and/or hands. For articulated open-chain bodies, such velocity and acceleration information is useful to help further estimate full body motion beyond feet by means of inversed kinematics or trajectory planning.

Furthermore, embodiments of the present invention may be useful in applications beyond gaming. For example, in a robot technology application, a robot may include a camera and a structural pattern recognition routine may be encoded into a processor that controls the robot. An entire room or other area may be covered by a suitable structurally encoded pattern. The robot can use a camera and the structural-pattern-based position determination technique described herein to navigate as it moves about the room based on artificial intelligence.

Other possible applications for embodiments of the present invention include, but are not limited to, applications in the toy industry. By way of example, a group of small motorized robotic toys can be fitted with cameras. Each camera can be coupled to a computer system configured to implement camera-based position detection in conjunction with a structurally encoded pattern, which can be laid out on a mat as described above. Each robot may act as a player on a sports team, such as a football team. Each robot toy can determine its position relative to a "field" using the structurally encoded pattern as a reference in the manner described above. The computer system can be configured to implement an artificial intelligence (AI) strategy game that can be controlled in real time by a user.

The reader's attention is directed to all papers and documents which are filed concurrently with this specification and which are open to public inspection with this specification, and the contents of all such papers and documents incorporated herein by reference.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. An input apparatus for a computer device, comprising:
a computer processor configured to execute computer executable instructions, wherein the instructions are configured to cause the computer device to:
   a) obtain an image of a least a portion of a structurally encoded pattern formed on a surface from a camera, wherein the structurally encoded pattern includes a plurality of elements, wherein each element is encoded with information identifying a location and orientation of the element with respect to the surface;
   b) identify at least a portion of one or more pattern elements in the image; and
   c) determine a position of the camera relative to the surface from the information encoded in the one or more pattern elements in the image, and wherein the computer processor is configured to use the position of the camera as a control input to a video game program.

2. The apparatus of claim 1 wherein the structurally encoded pattern includes a plurality of cells, wherein each cell contains a unique element that is different from every other element in every other cell in the pattern.

3. The apparatus of claim 1 wherein each element is not rotationally symmetric with respect to an axis normal to the plane of the surface.

4. The apparatus of claim 1 wherein the computer processor is configured to determine coordinates of a location of the camera relative to the pattern.

5. The apparatus of claim 1 wherein the computer processor is configured to determine an angular orientation of the camera relative to the pattern.

6. The apparatus of claim 1 wherein the computer processor is configured to compare the image to reference data representing the pattern.

7. The apparatus of claim 1, further comprising the camera, wherein the camera is coupled to the computer processor.

8. The apparatus of claim 7 wherein the camera is adapted to be mounted to a user's foot.

9. The apparatus of claim 7 wherein the camera is adapted to be mounted to a user's hand.

10. The apparatus of claim 1, further comprising a mat, wherein the structurally encoded pattern is formed on the mat.

11. An input apparatus for a computer device, comprising:
a structurally encoded pattern formed on a surface, wherein the structurally encoded pattern includes a plurality of elements, wherein each element is encoded with information identifying a location and orientation of the element with respect to the surface;
a camera operable to obtain an image of at least a portion of the pattern; and
a processor unit coupled to the camera, wherein the processor is configured to identify at least a portion of one or more elements in the image and determine a position of the camera relative to the surface from the information encoded in the one or more pattern elements in the image, and wherein the processor unit is configured to use the position of the camera as a control input to a video game program.

12. A method for receiving a control input to a video game program, comprising:
obtaining an image of a least a portion of a structurally encoded pattern formed on a surface with a camera, wherein the structurally encoded pattern includes a plurality of elements, wherein each element is encoded with information identifying a location and orientation of the element with respect to the surface;
with a processor unit coupled to the camera, identifying at least a portion of one or more pattern elements in the image; and
with the processor unit, determining a position of the camera relative to the surface from the information encoded in the one or more pattern elements in the image, and wherein the position of the camera is the control input to the video game program.

13. The method of claim 12 wherein the structurally encoded pattern includes a plurality of cells, wherein each cell contains a unique element that is different from every other element in every other cell in the pattern.

14. The method of claim 12 wherein each element is not rotationally symmetric with respect to an axis normal to the plane of the surface.

15. The method of claim 12 wherein the structurally encoded pattern is formed on a mat.

16. The method of claim 12 wherein the processor is configured to determine coordinates of a location of the camera relative to the pattern.

17. The method of claim 12 wherein the processor is configured to determine an angular orientation of the camera relative to the pattern.

18. The method of claim 12 wherein the processor is configured to compare the image to reference data representing the pattern.

19. The method of claim 12 wherein the camera is adapted to be mounted to a user's foot.

20. The method of claim 12 wherein the camera is adapted to be mounted to a user's hand.

21. A non-transitory computer readable storage medium having embodied therein computer executable instructions that, upon execution, cause a computer to implement a method for receiving a control input to a video game program, the method comprising:
obtaining an image of a least a portion of a structurally encoded pattern formed on a surface with a camera, wherein the structurally encoded pattern includes a plurality of elements, wherein each element is encoded with information identifying a location and orientation of the element with respect to the surface;
identifying at least a portion of one or more pattern elements in the image; and
determining from the one or more portions a position of the camera relative to the surface from the information encoded in the one or more pattern elements in the image, and wherein the position of the camera is the control input to the video game program.

* * * * *